United States Patent
Lewis et al.

(10) Patent No.: US 11,821,506 B2
(45) Date of Patent: Nov. 21, 2023

(54) GEARBOX ASSEMBLY FOR HOBBY ROBOTICS

(71) Applicant: Robotzone, LLC, Winfield, KS (US)

(72) Inventors: Kyle Ray Lewis, Winfield, KS (US); Brian Thomas Pettey, Winfield, KS (US); Kevin Michael Meyer, Winfield, KS (US); Jason John Jaeger, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 0 days.

(21) Appl. No.: 17/647,742

(22) Filed: Jan. 12, 2022

(65) Prior Publication Data

US 2022/0221041 A1 Jul. 14, 2022

Related U.S. Application Data (60) Provisional application No. 63/136,925, filed on Jan. 13, 2021.

(51) Int. Cl.
*F16H 57/02* (2012.01)
*F16H 57/021* (2012.01)

(52) U.S. Cl.
CPC . *F16H 57/021* (2013.01); *F16H 2057/02034* (2013.01)

(58) Field of Classification Search
CPC ......... F16H 57/021; F16H 2057/02034; F16H 2057/02026; F16H 2057/02069; F16H 2057/02073; F16H 57/031; F16H 57/033; F16H 2057/0335
See application file for complete search history.

(56) References Cited

U.S. PATENT DOCUMENTS

| | | | | |
|---|---|---|---|---|
| 5,967,693 A | * | 10/1999 | Braaten | E21B 17/03 403/361 |
| 7,795,768 B2 | * | 9/2010 | Pettey | H02K 7/116 310/83 |
| 9,303,729 B2 | * | 4/2016 | Wang | F16H 57/023 |
| 11,162,415 B2 | * | 11/2021 | O'Brien | H02K 7/003 |
| 2013/0099614 A1 | | 4/2013 | Pettey | |

(Continued)

FOREIGN PATENT DOCUMENTS

| | | | | |
|---|---|---|---|---|
| CN | 102425596 A | * | 4/2012 | |
| CN | 108488352 A | * | 9/2018 | |
| CN | 108527380 A | * | 9/2018 | ............. A47G 23/08 |

OTHER PUBLICATIONS

International Search Report and Written Opinion for International Patent Application No. PCT/US2022/012095, dated May 2, 2022, 10 pages.

*Primary Examiner* — Sherry L Estremsky
(74) *Attorney, Agent, or Firm* — Christopher R. Christenson; Kelly, Holt & Christenson, PPLC (57) ABSTRACT

A motor gearbox system includes a motor. The system further includes a mount configured to couple to the motor. The system also includes a housing configured to couple to the mount, and a coupler configured to couple to the housing, the coupler having at least one mounting feature configured to couple to a component. The system further includes a gear system operably coupled to the motor and configured to be disposed, at least in part, within a gearbox formed by the coupled mount, housing and coupler. The system includes an output shaft operably coupled to the gear system.

15 Claims, 14 Drawing Sheets

(56) References Cited

U.S. PATENT DOCUMENTS

2014/0371028 A1 12/2014 Billmeyer
2016/0076622 A1 3/2016 Hu et al.
2017/0059003 A1 3/2017 Wagh et al.
2018/0112691 A1* 4/2018 Pettey .................. F16D 1/0847

* cited by examiner

GEARBOX ASSEMBLY FOR HOBBY ROBOTICS

CROSS-REFERENCE TO RELATED APPLICATION

The present application is based on and claims the benefit of U.S. provisional patent application Ser. No. 63/136,925, filed Jan. 13, 2021, the content of which is hereby incorporated by reference in its entirety.

BACKGROUND

Hobby robotic systems often include a variety of structural and motion components coupled to one another. In the field of hobby robotics, it is common to assemble these various structural and motion components to create robotic systems. Components may include, for example, motors, coupling mechanisms, actuators, sensors, gear systems, and the like. Different components may be assembled in various configurations depending on the desired operation of the system by a user.

SUMMARY

A motor gearbox system includes a motor. The system further includes a mount configured to couple to the motor. The system also includes a housing configured to couple to the mount, and a coupler configured to couple to the housing, the coupler having at least one mounting feature configured to couple to a component. The system further includes a gear system operably coupled to the motor and configured to be disposed, at least in part, within a gearbox formed by the coupled mount, housing and coupler. The system includes an output shaft operably coupled to the gear system.

DETAILED DESCRIPTION OF ILLUSTRATIVE EMBODIMENTS

In the field of hobby robotics, it is common to assemble various structural and motion components to create robotic systems. In such systems, motion components may include a rotational actuator with an output shaft, such as an electric motor. Such motors can lack the torque required for certain operations and in such situations a gearbox can be provided to increase the torque provided by the motor or other actuator. However, gearboxes can be overly cumbersome and increase the size of the system. Gearboxes can also limit the ways in which the motor/gearbox assembly can couple to other components.

Accordingly, this disclosure illustrates example gearbox assemblies that includes features to reduce the size of the gearbox assembly while retaining its functionality. In one example herein, the gearbox is substantially no larger than the motor in two dimensions and only increases the size the motor in a third direction (e.g., the height of the motor). To reduce the size of the gearbox, the mounting plate that typically mounts to the motor may be strategically placed. In one example, the plate is completely covered by a ring gear of the gearbox. In this way, the gearbox becomes more compact so that it can fit in space-limited assemblies.

Additionally, as further described below with respect to FIG. 5, the ring gear of the planetary gearbox has similar geometry on each end. The similar geometry allows the coupler (also referred to as a face) of the gearbox to be bolted to both ends, replacing the motor. Doing so would allow the construction of a reduction gearbox with an input shaft that would replace a motor. In one embodiment, the ring gear has a uniform and matching geometry on each end about the gearbox housing.

In one example, the gearbox output shaft bearings are sunken into the housing of the gearbox. The outer bearing that holds the output shaft is sunken into the face of the gearbox to allow components to more closely locate on a shelf between a thicker portion of the output shaft (that is disposed within the outer bearing), and an exposed smaller shaft portion. This recessed/sunken bearing makes room for items, such as thrust bearings, ball bearings, collars, pinion gears, etc. in space-limited assemblies. Additionally, the open space created about the output shaft allows collars and rotating components, with a diameter smaller than the open space to be mounted and/or coupled in the appropriate location. In some examples, diameter clearance cuts on the face allows for nearby bearings, collars, shafts and other rotating components to coexist. The clearance cuts may be, for example, 14 mm (millimeter) diameter clearance cuts.

Since a gearbox receives a shaft of the motor and also has an output shaft of its own, the output shaft of the gearbox can include additional features that are not present on the motor output shaft. For example, the output shaft of the gearbox can have a profile that is a blend of a hexagon feature (to create a positive drive with a mating part of a profile-matched bore), and a round feature (to allow parts with an appropriate diameter bore to fit properly). In one example and further described below, the hexagon is a 7 mm flat to flat hexagon and the round has an 8 mm diameter. In some instances, the length of the shaft is chosen to protrude the right amount through the structure that the motor is attached to, such that the couplers and other mating components can fasten onto the shaft without interference with the structural walls or other pieces that coexist within the assembly. In one embodiment, this distance is 23.5 mm. However, in other embodiments, the shaft length may be adjusted based on the structural composition of the assembly.

In some examples, a threaded aperture is provided on the end of the shaft. In one example, the threaded aperture is a M4 hole. Further, the gearbox can have additional structural mounting components that allow the motor to be coupled to the items in other ways than standard motor mounts. For example, the gearbox coupler can have 8 mm, 16 mm and/or 24 mm mounting patterns. The 16 mm threaded hole pattern, for example, allows for the mating of the gear motor to any part that has through-holes corresponding to the 16 mm pattern. In one embodiment, the 24 mm threaded hole pattern is sunken into the face such that an object, such as a flat beam, can attach and remain on the grid pattern. For instance, the 24 mm threaded hole pattern may be sunken in by 4 mm.

Figure 1:
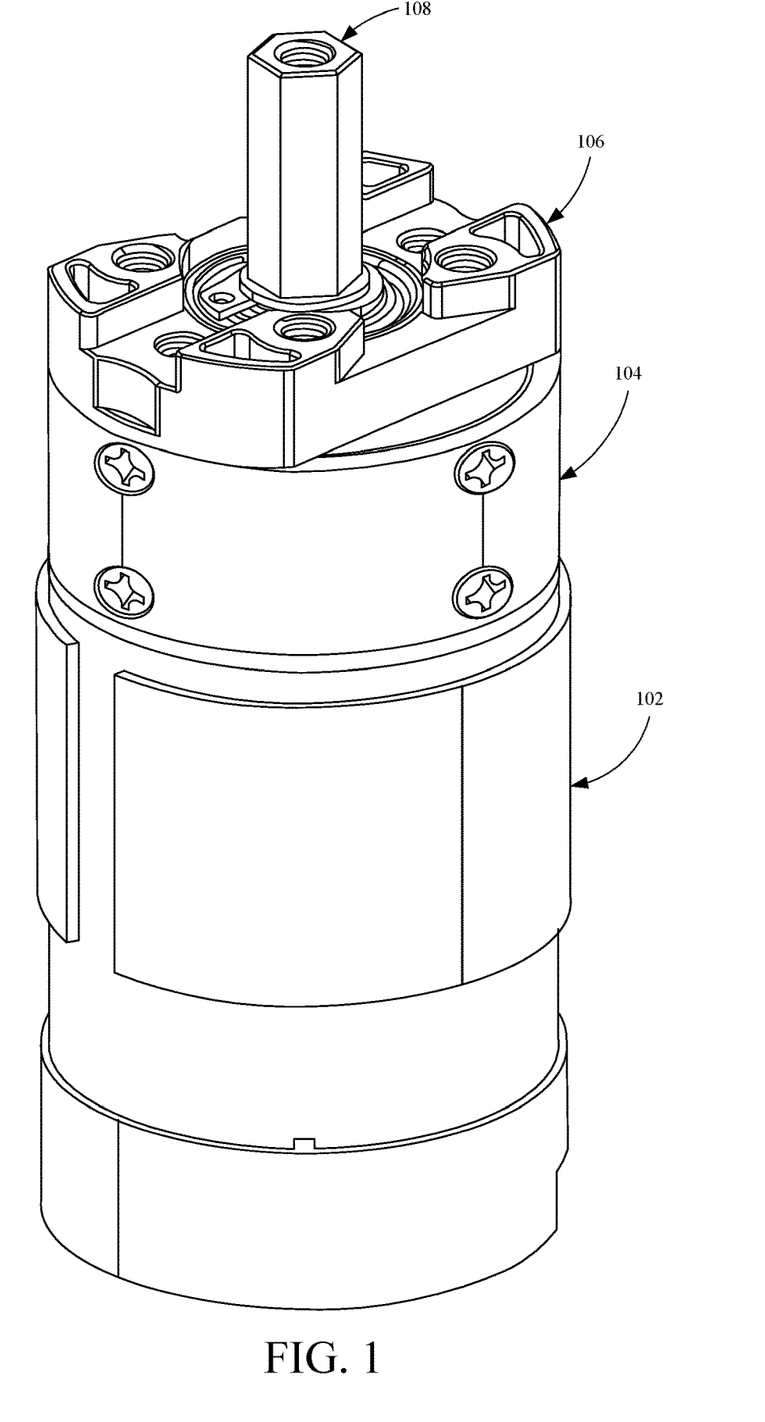
FIG. 1 is a perspective view showing an example motor and gearbox assembly with which embodiments of the present invention are particularly applicable.

FIG. 1 is a perspective view showing an example motor and gearbox assembly with which embodiments of the present invention are particularly applicable. Assembly 100 includes motor 102, gearbox 104, coupler 106 and output shaft 108. Motor 102, as shown, is an electrically driven motor. However, in other examples, motor 102 can be replaced with any other motion component that has an output shaft that can be received by the gearbox 104. Gearbox 104 receives an output shaft of motor 102 and changes the driving ratio of the output shaft of motor 102 to output shaft 108 of gearbox 104. Gearbox software can also include coupler 106 that has various mounting components that allow assembly 102 to be coupled to another object. For example, the gearbox coupler can have 8 mm, 16 mm and/or 24 mm mounting patterns, which allow for the mating of the gear motor to any part that has through-holes corresponding to the pattern. Output shaft 108 includes various features that couple to an external component. For example, as illustrated in FIG. 1, a threaded aperture is provided on the end of the shaft to allow for a unique way to attach components to output shaft 108. Additionally, as illustrated, output shaft 108 may have a hexagonal shape to create a positive drive with a mating part with a profile-matched bore. Further, output shaft 108 may also include a round shape having a set diameter to allow parts with a corresponding diameter to fit properly. As shown gearbox 104, coupler 106 and output shaft 108 can comprise a metal material such as aluminum and/or steel. In some examples, output shaft 108 comprises a stainless-steel material, and coupler 106 and gearbox 104 comprise aluminum.

Figure 2:
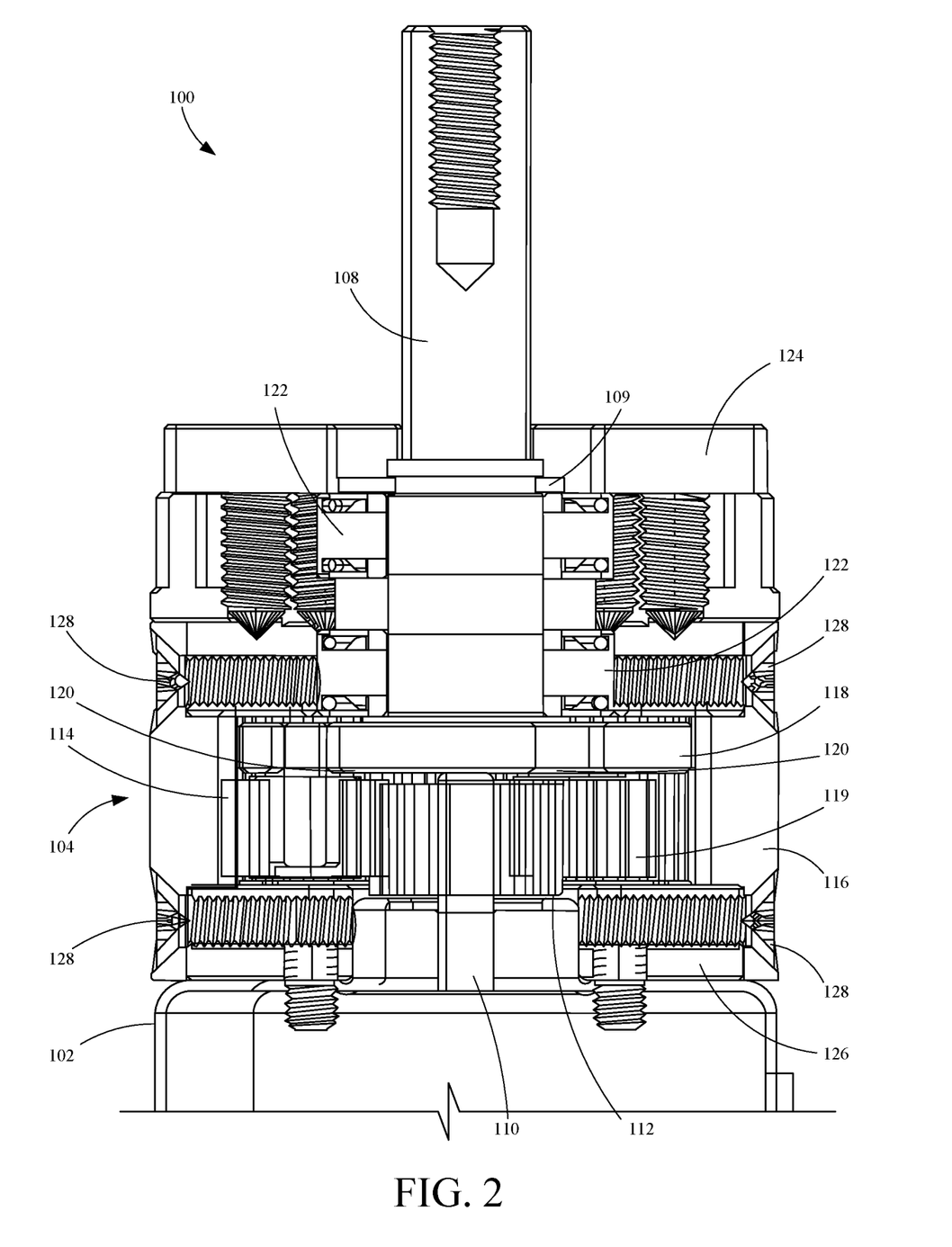
FIG. 2 is a sectional view showing an example motor gearbox assembly with which embodiments of the present invention are particularly applicable.

FIG. 2 is a sectional view showing an example motor gearbox assembly with which embodiments of the present invention are particularly applicable. As shown, motor 102 is coupled to mount 126 by fasteners 130, which is seen more clearly in FIG. 3. Additionally, mount 126 is coupled to housing 116 by fasteners 128, and coupler 124 is coupled to housing 116 by fasteners 128. As illustrated, fasteners 128 and 130 are threaded fasteners. Output shaft 108 is disposed within coupler 124 via carrier 118. The output shaft is disposed within coupler 124 at a length strategically chosen such that the correct length of output shaft 108 protrudes through a desired structure that motor 102 is attached to.

Mount 126 includes through-holes that allow fasteners 130 to pass-through and couple to motor 102. Additionally, housing 116 has through-holes that allow fasteners 128 to pass-through and couple to either mount 126 or coupler 124. In some examples, housing 116 is reversible and can be reversed such that the apertures that are aligned with coupler 124 can be switched with the apertures that are aligned with mount 126. Motor 102 has a motor shaft 110 that is coupled to a gear 112. As shown, gear 112 is a sun gear in a planetary gear system. Gear 112 engages planetary gears 114 which further engage the ring gear of housing 116, described further in FIG. 5.

As shown, planetary gears 114 are coupled to carrier 118 by pins 120. In operation, as the motor shaft 110 coupled to gear 112 rotates, it drives gears 114, which are rotated about pins 120 and motor shaft 110. Thus, as gears 112 rotates, carrier 118 rotates at a slower pace. As shown, carrier 118 is coupled to the output shaft 108 and is held within coupler 124 by bearings 122. Bearings 122 reduce the friction between output shaft 108 and coupler 124. Bearings 122 can also help reduce sideloading on motor 102. Output shaft 108 is prevented from being pushed into the gearbox by snap ring 109. Specifically, a second portion of output shaft 108 within the bearings is of a larger diameter than the first portion, which allows snap ring 109 to couple to output shaft 108 and thus constrain output shaft 108 from being pushed into the gearbox.

Figure 3:
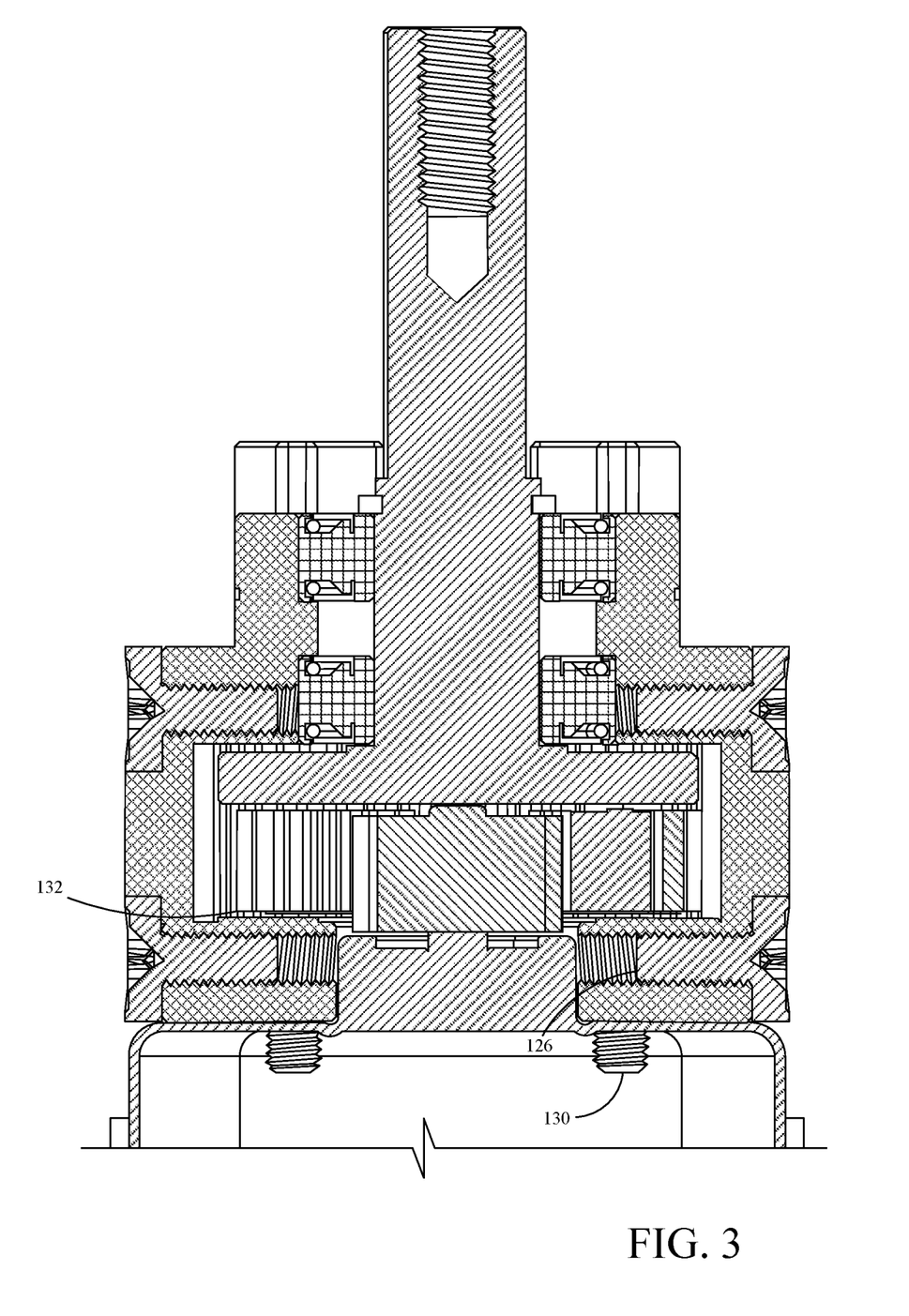
FIG. 3 is a sectional view showing another example motor gearbox assembly with which embodiments of the present invention are particularly applicable.

FIG. 3 is a sectional view showing another example motor gearbox assembly with which embodiments of the present invention are particularly applicable. FIG. 3 bear some similarities to FIG. 2, and like components are numbered similarly. In this view, a narrow portion of coupler 124 can be seen. The narrow portion of coupler 124 is defined by flat surfaces, such as flat surfaces 302 shown below with respect to FIG. 11. In some examples, the flat surfaces 302 are spaced such that an accessory or tool can interact with coupler 124. Further, fasteners 130 are also more clearly illustrated, which serve to couple motor 102 to mount 126. Additionally, the arrangement of gears 112 in gear 114 can be seen. As shown, there are three planetary gears, however, in other examples, there may be fewer or additional planetary gears 114. Finally, mounting plate 132 is shown, which is configured to mount to motor 102. As illustrated, mounting plate 132 is strategically placed to be completely covered by gears 112 of the gearbox. In this way, the gearbox becomes more compact so that it can fit in space-limited assembles. Thus, the size of the gearbox is reduced.

Figure 4:
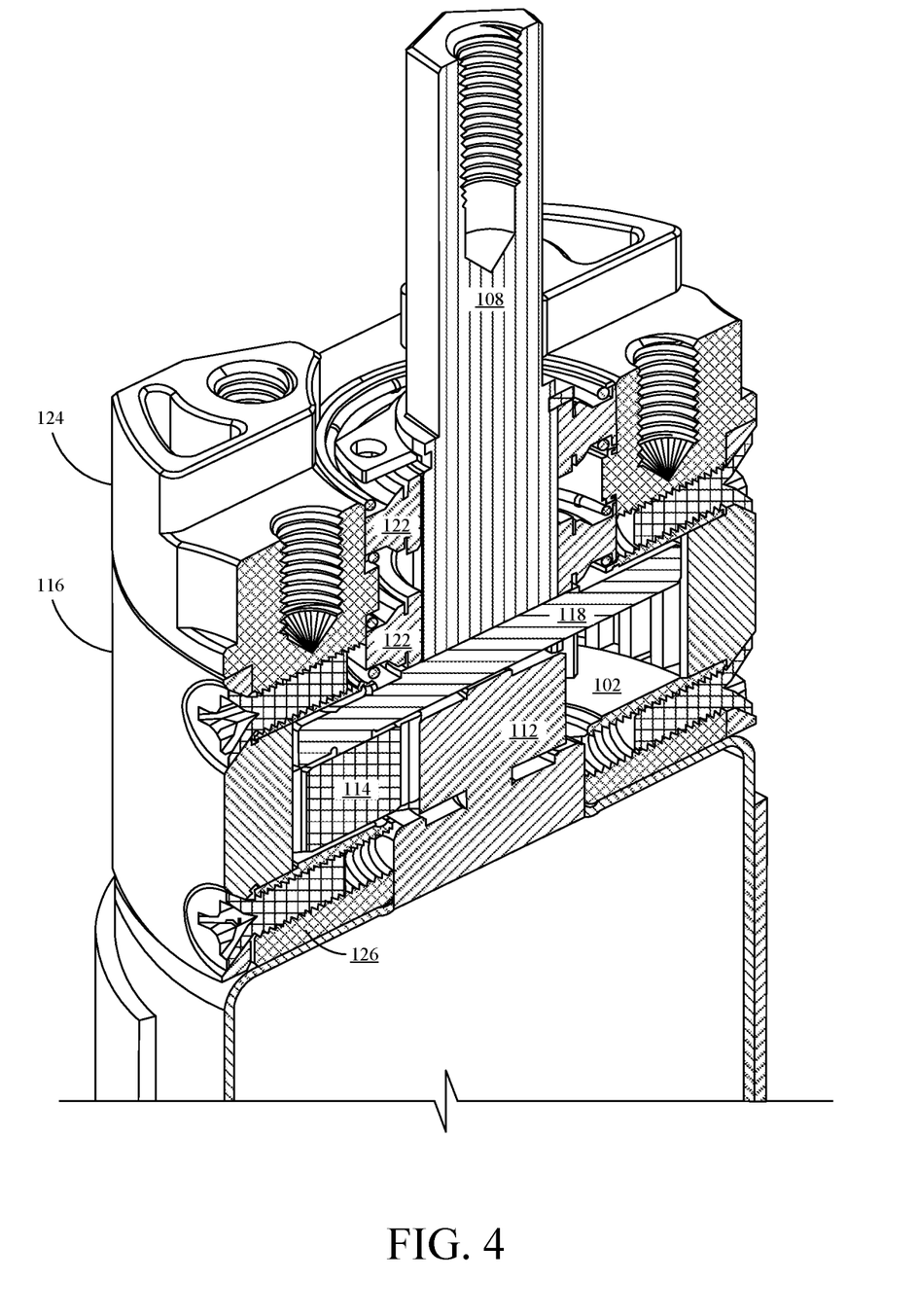
FIG. 4 is a sectional perspective view showing an example motor gearbox assembly in accordance with an embodiment of the present invention.

FIG. 4 is a sectional perspective view showing an example motor gearbox assembly in accordance with an embodiment of the present invention. FIG. 4 bears some similarities to FIGS. 2-3, and like components are numbered accordingly. In this view, some contours of the components are more easily seen. For example, as illustrated, output shaft 108 is disposed within coupler 124 via carrier 118. The output shaft is disposed within coupler 124 at a length strategically chosen such that the correct length of output shaft 108 protrudes through a desired structure that motor 102 is attached to. As illustrated, the second lower portion of output shaft 108 is of a larger diameter than the first portion, which allows a snap ring to couple to output shaft 108 and thus constrain it from being pushed further into the gearbox. Additionally, a threaded aperture disposed at an end of output shaft 108 is more visibly shown. In one example, the threaded aperture is a M4 hole.

Figure 5:
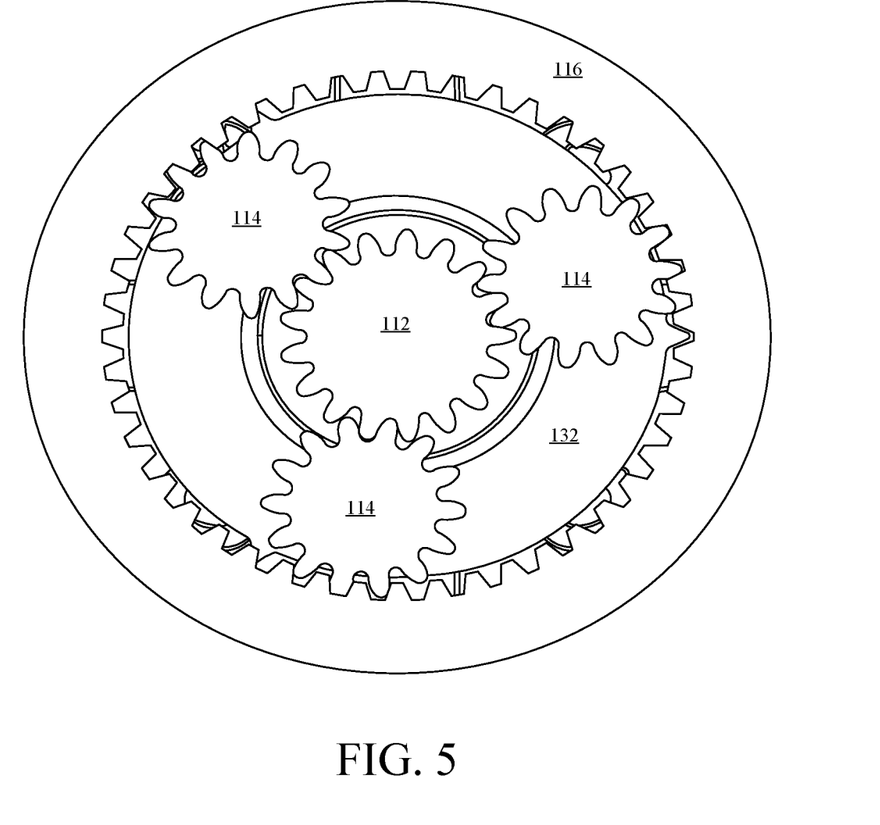
FIG. 5 is a sectional view showing an example planetary gear assembly in accordance with an embodiment of the present invention.

FIG. 5 is a sectional view showing an example planetary gear assembly in accordance with an embodiment of the present invention. As shown, there are three planetary gears 114 and a singular sun gear 112 within a ring gear of housing 116. In other examples, there may be additional gears or different arrangements of the gears. For instance, multiple planetary gear arrangements are stacked on one another to further alter the drive ratio between motor shaft 110 and output shaft 108. In operation, gear 112 engages planetary gears 114 which further engage the ring gear of housing 116. As illustrated, the ring gear of the planetary gearbox has a similar geometry on each end. The similar geometry allows the coupler to be bolted to both ends, replacing the motor. In doing so, this allows the construction of a reduction gearbox with an input shaft that would replace a motor. In one embodiment, the ring gear has a uniform and matching geometry on each end about housing 116.

Figure 6:
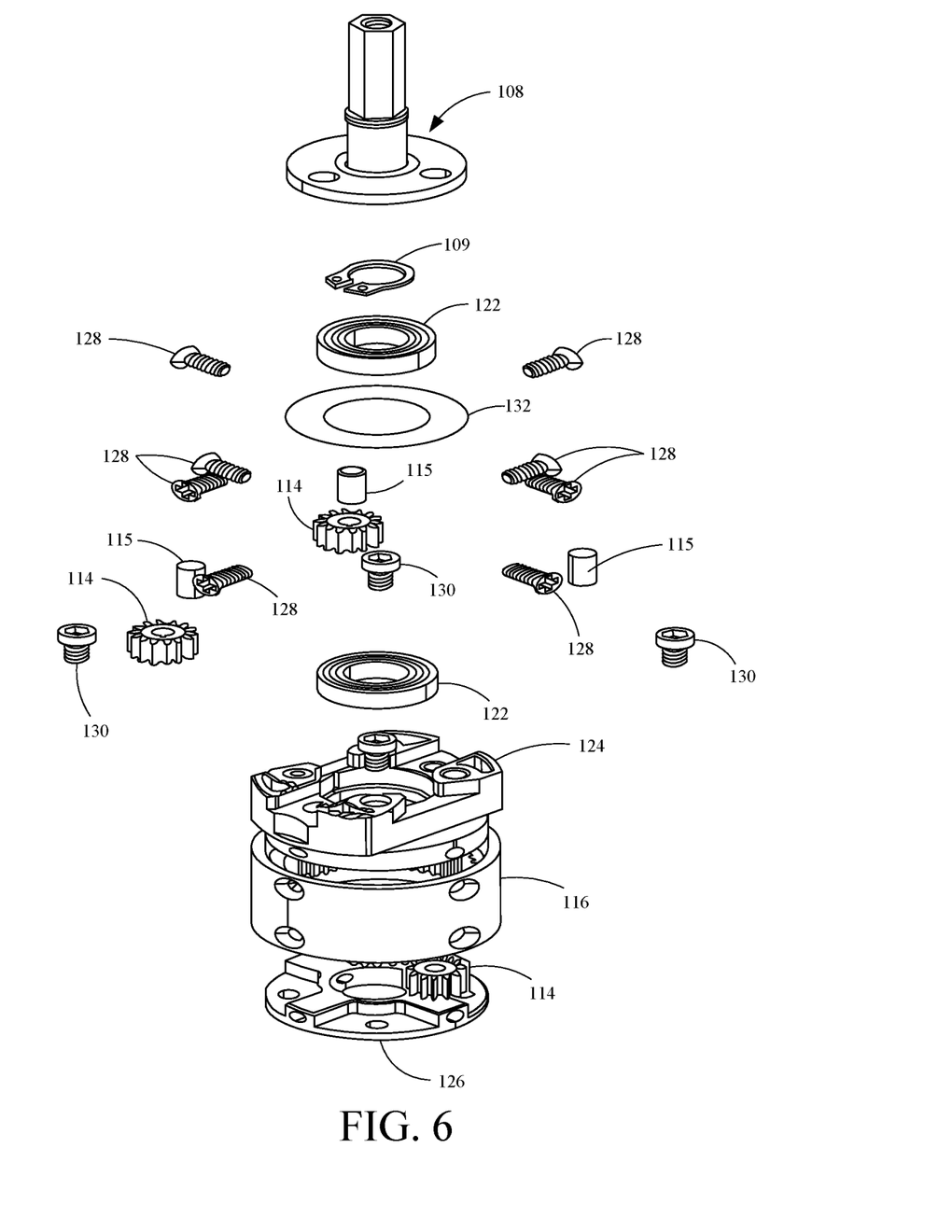
FIG. 6 is an exploded perspective view showing an example motor gearbox assembly with which embodiments of the present invention are particularly applicable.

FIG. 6 is an exploded perspective view showing an example motor gearbox assembly with which embodiments of the present invention are particularly applicable. FIG. 6 bears some similarities to FIG. 2, and like components are numbered accordingly. As illustrated, mounting plate 132 is more clearly shown to be a ring shape. Upon assembly, mounting plate 132 is strategically placed to be completely covered by gears 112 of the gearbox. Additionally, shown more clearly in this figure are bearings 122, snap ring 109, pins 115, gears 114, and shaft 110. When shaft 110 and gears 112 rotate, the engagement drives gear 114, as described in more detail below in FIG. 8. Finally, fasteners 128 and 130 are more visibly shown. As shown, fasteners 128 and 130 are threaded fasteners.

Figure 7:
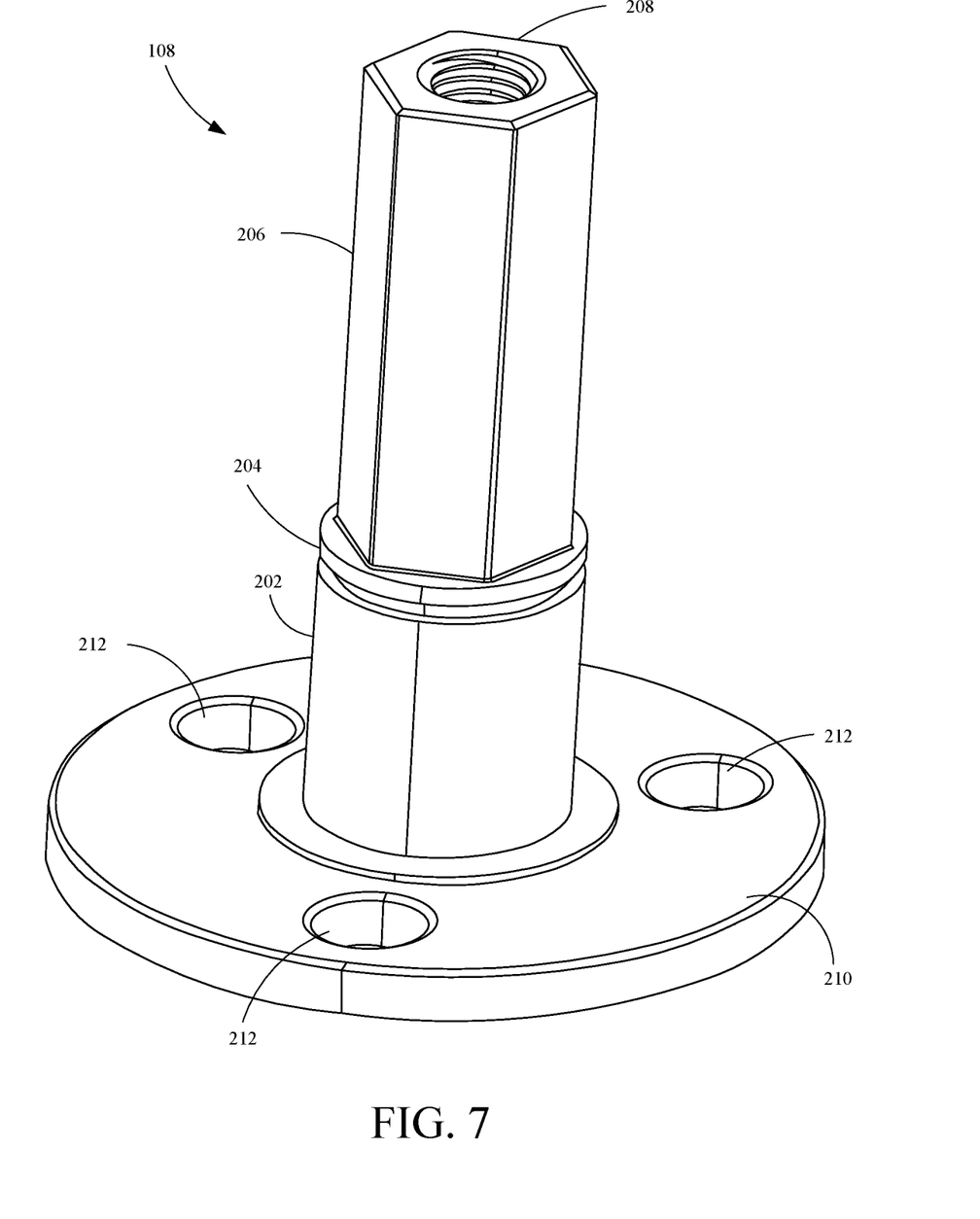
FIG. 7 is a perspective view showing an example output shaft in accordance with an embodiment of the present invention.

FIG. 7 is a perspective view showing an example output shaft in accordance with an embodiment of the present invention. As shown, output shaft 108 includes shaft 202, snap ring groove 204, hex portion 206, threaded aperture 208, carrier 210 and planetary apertures 212. Shaft 202 allows output shaft 108 to couple to a bearing to reduce friction between output shaft 108 and another component. In some examples, shaft 202 is 10 mm in diameter and is received by a ball bearing. Output shaft 202 illustratively includes groove 204 that allows for the coupling of a snap ring onto output shaft 108. As described above, the snap ring prevents or reduces the longitudinal movement of the output shaft 108. Hex portion 206 includes hexagonal features such that output shaft 108 can be coupled to another component to provide rotational movement to the component. In this way, a positive drive is created with a mating part of a profile-matched bore. Hex portion 206 can also include round features such that the output shaft can be received in a (circular or otherwise) aperture. In some examples, hex portion 206 has a 7 mm flat to flat size and an 8 mm corner to corner size. This configuration allows portion 206 to be received by an 8 mm round aperture, or couple to a 7 mm hex component. Additionally, aperture 208 allows for the output shaft to be coupled to another component. In some examples, threaded aperture 208 is a 4 mm aperture. Output shaft 108 is driven by planetary gears that couple to the output shaft 108 through planetary apertures 212 located on planetary carrier 210. As shown, there are three planetary apertures 212, however, in other examples there may be a different amount of planetary apertures 212.

Figure 8:
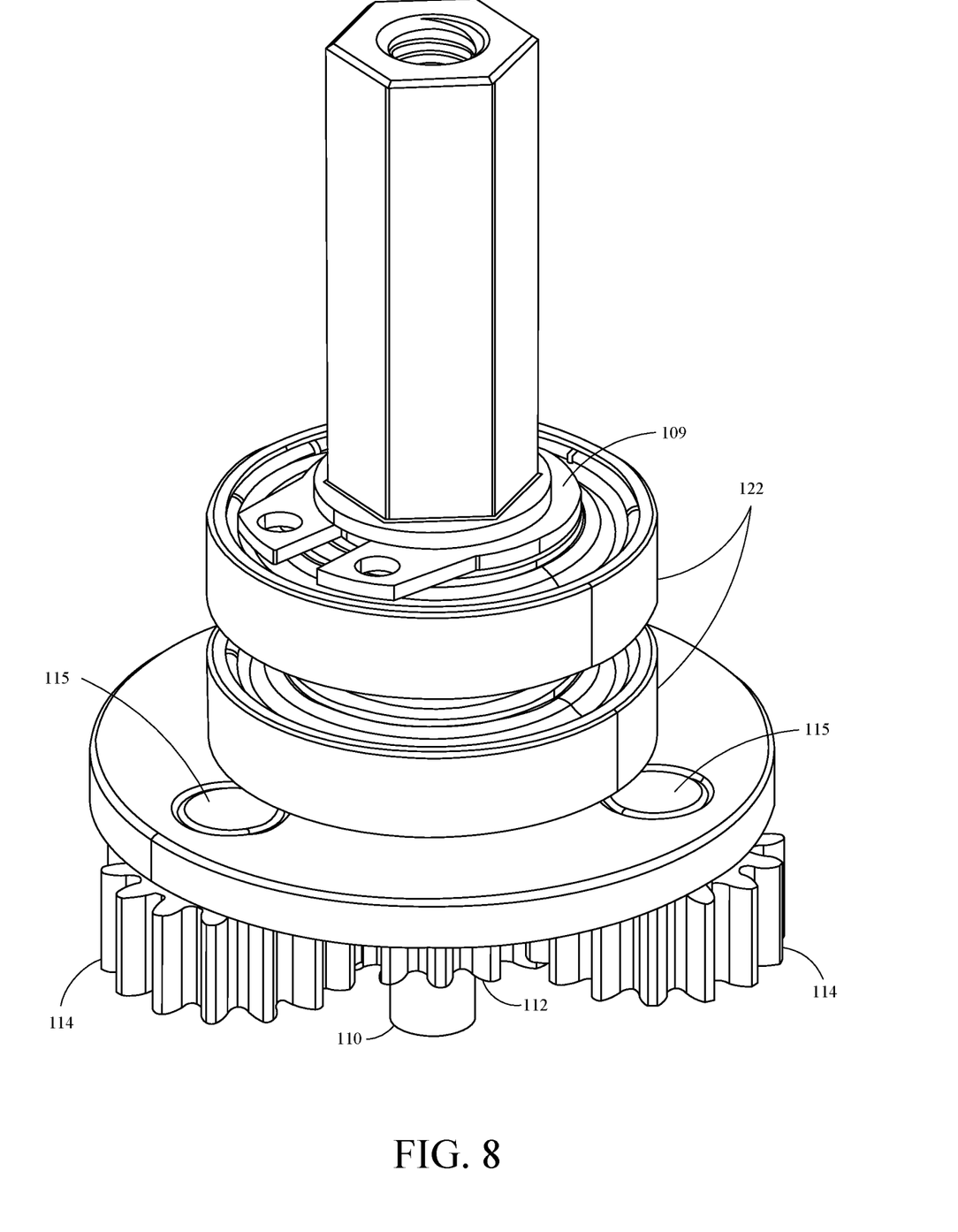
FIG. 8 is a perspective view showing an example output shaft assembly in accordance with an embodiment of the present invention.

FIG. 8 is a perspective view showing an example output shaft assembly in accordance with an embodiment of the present invention. As shown in this figure are bearings 122, snap ring 109, pins 115, gears 114, shaft 110 and gear 112. When shaft 110 and gear 112 rotate, the engagement of gear 112 and gear 114 drives gear 114. Gears 114, when rotated, transfer energy to shaft 118 through pins 115. In other words, in operation, as shaft 110 coupled to gear 112 rotates, it drives gears 114, which are rotated about pins 115 and shaft 110. Thus, as gears 112 rotates, the carrier (such as carrier 118) rotates at a slower pace.

Figure 9:
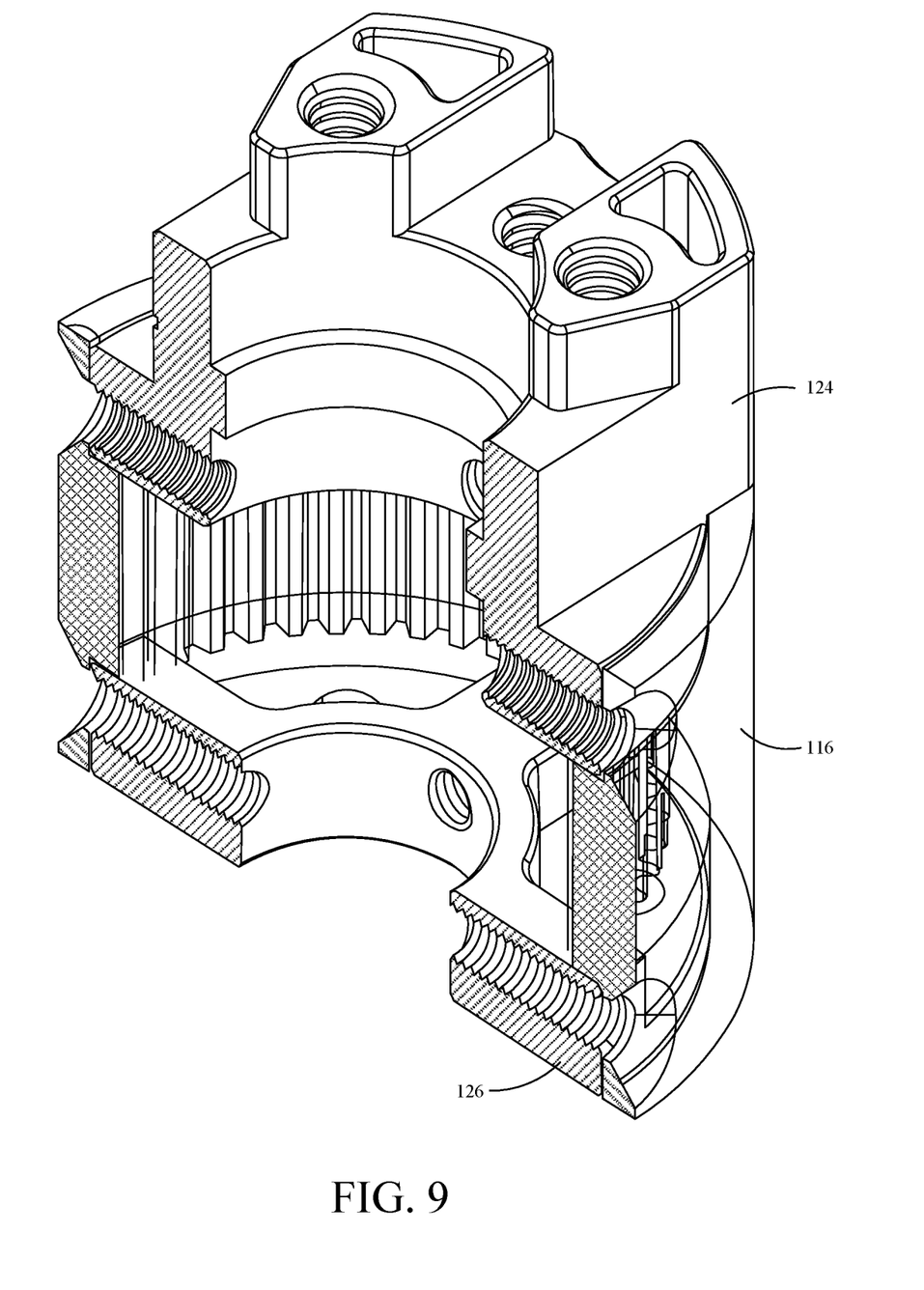
FIG. 9 is a perspective sectional view showing an example gearbox housing assembly in accordance with an embodiment of the present invention.
Figure 10:
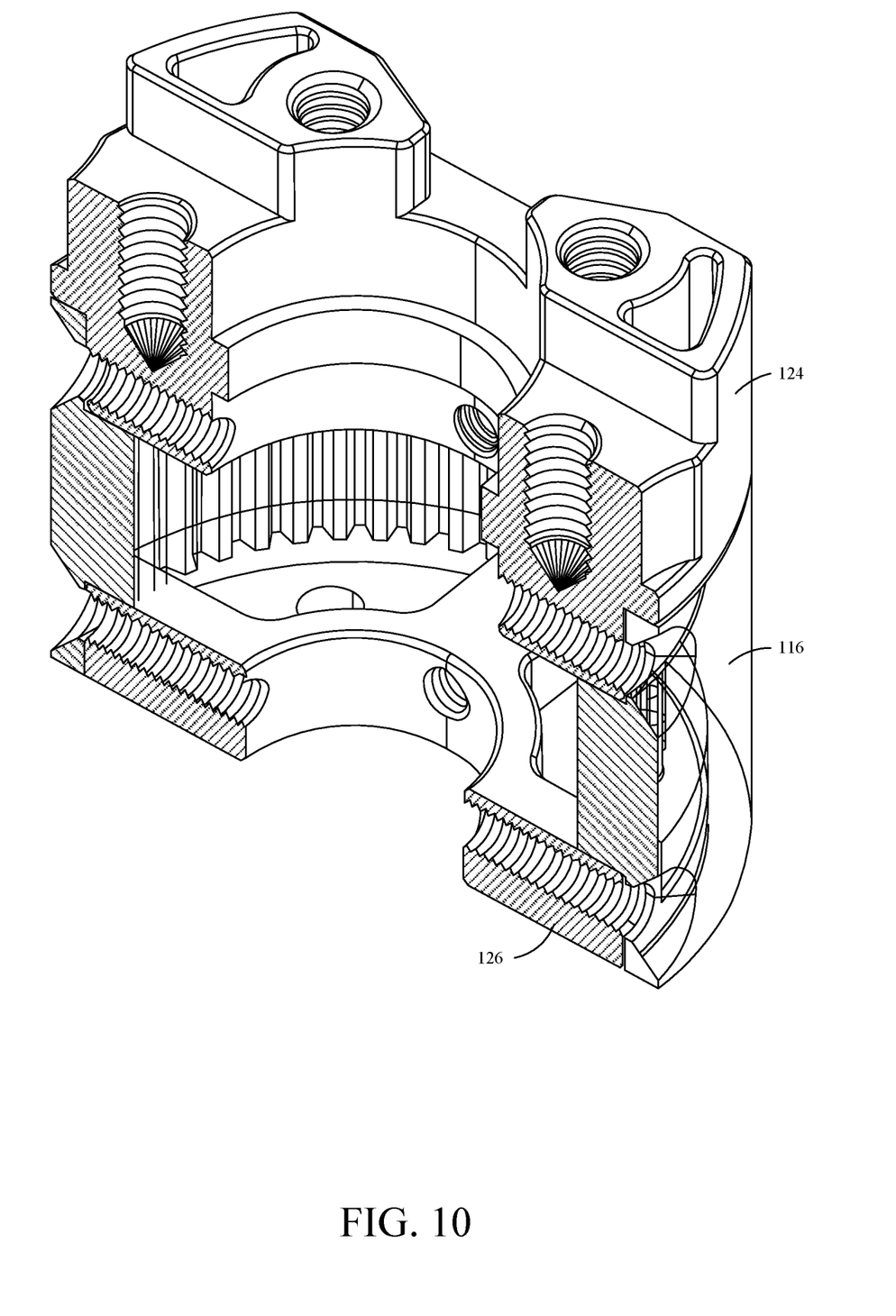
FIG. 10 is a perspective sectional view showing an example gearbox housing assembly in accordance with an embodiment of the present invention.

FIG. 9 and FIG. 10 illustrate a perspective sectional view showing an example gearbox housing assembly in accordance with an embodiment of the present invention. FIG. 10 is a perspective sectional view of a gearbox housing assembly taken from a plane perpendicular to the plane of sectional plane of FIG. 9. As shown, mount 126 is coupled to housing 116 and housing 116 is coupled to coupler 124. In other examples, coupler 124 can be interchangeable such that either part fits on either side of housing 116.

Figure 11:
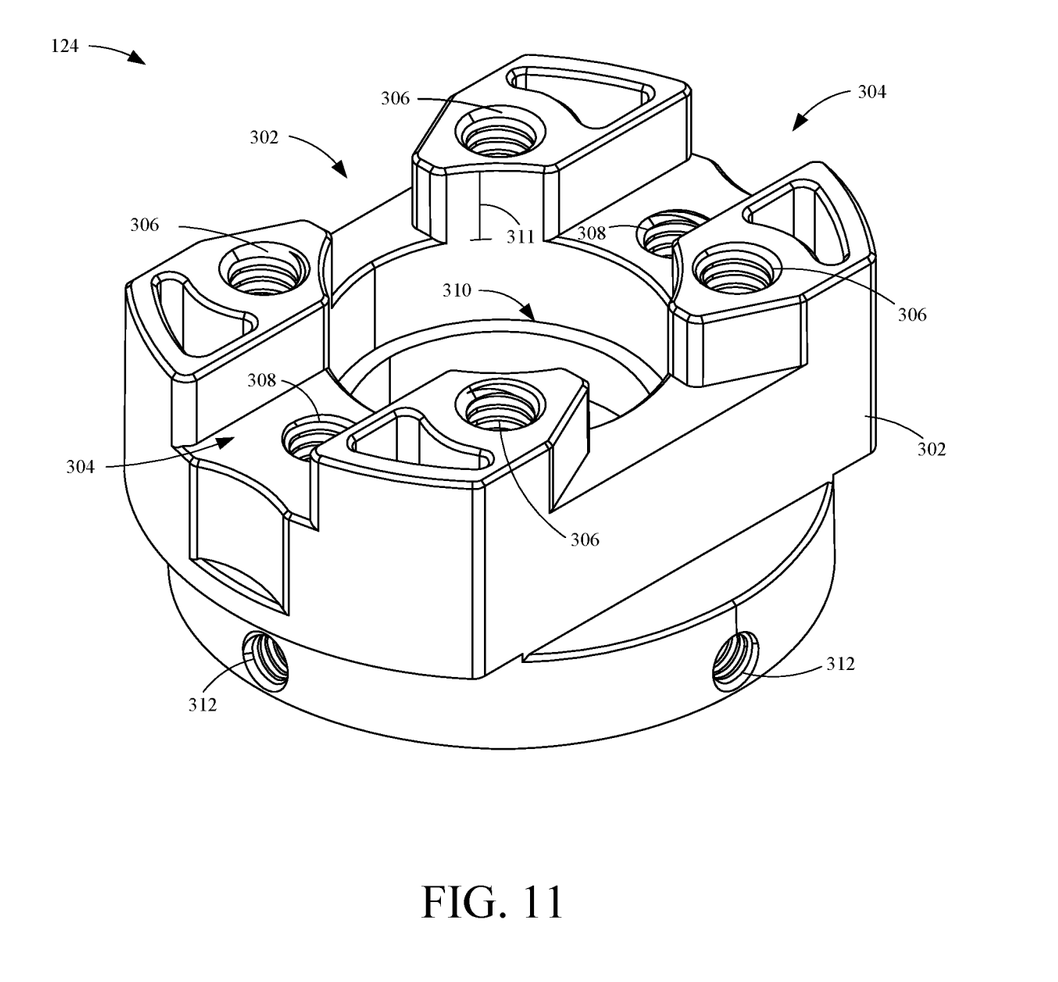
FIG. 11 is a perspective view showing an example coupler in accordance with an embodiment of the present invention.
Figure 12:
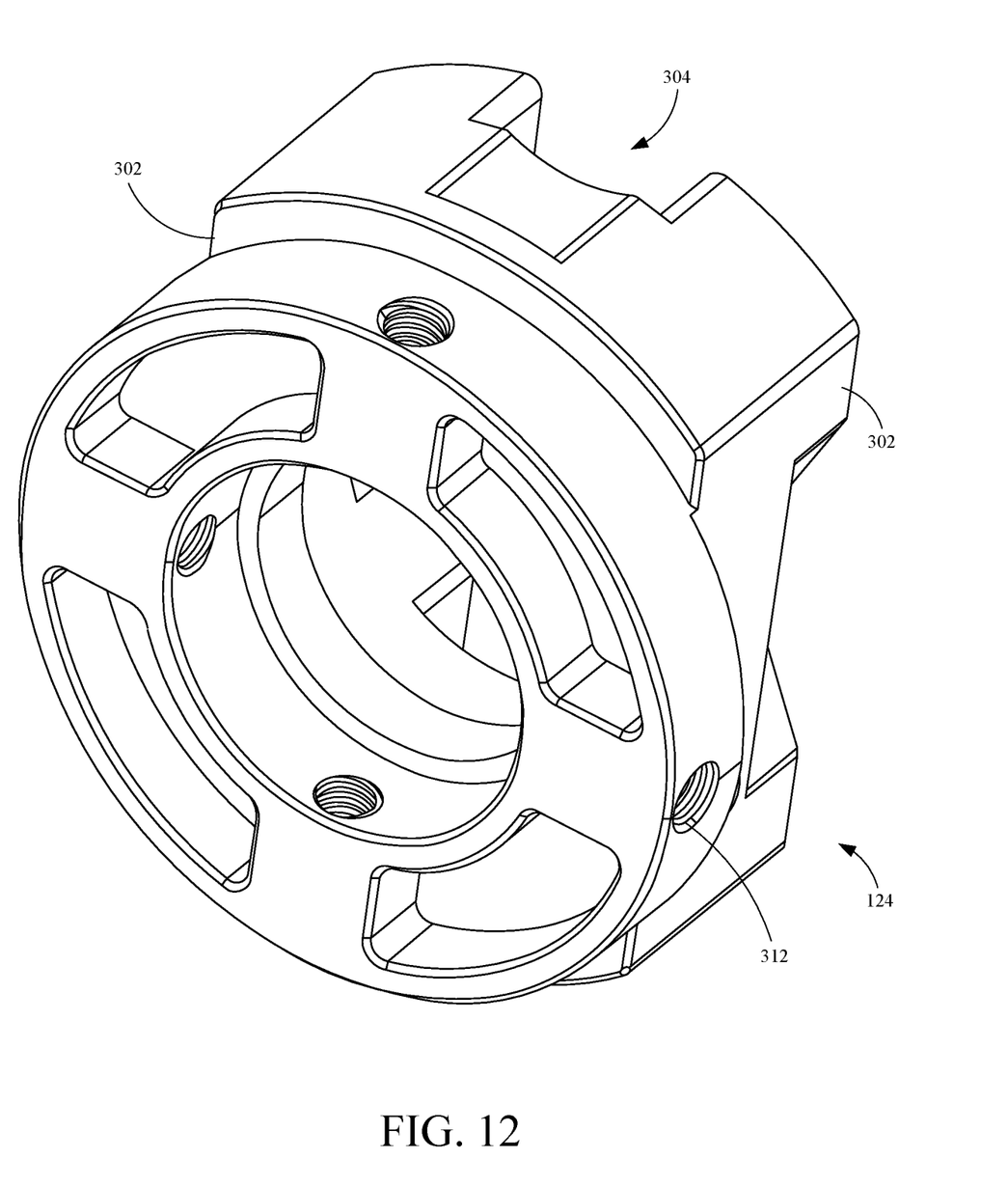
FIG. 12 is a bottom perspective view showing an example coupler in accordance with an embodiment of the present invention.

FIG. 11 and FIG. 12 are perspective views showing an example coupler in accordance with an embodiment of the present invention. Coupler 124 includes a variety of features that allow for coupling of coupler 124 to the motor/gearbox assembly and to another component in a robotic system. Mounting apertures 306 include threaded apertures that couple to a corresponding hole pattern of another component. Flat surfaces 302 are spaced such that an accessory or tool can interact with coupler 124, and are configured to couple coupler 124 to a component having one or more corresponding flat surfaces. In one example, flat surfaces 302 are spaced apart 24 mm. In this way, the open space created by flat surfaces 302 allows components with a diameter of less than 24 mm to be mounted to an aperture only 24 mm away from the location of the gear motor.

Aperture 310 can include various features for various functions. Aperture 310 can be sized to accommodate ball bearings. Additionally, aperture 310 can be sized to allow a part to rotate without contacting the raised portions containing apertures 306. Channel 304 can be sized to allow the mounting of components at least partially within channel 304.

Figure 13:
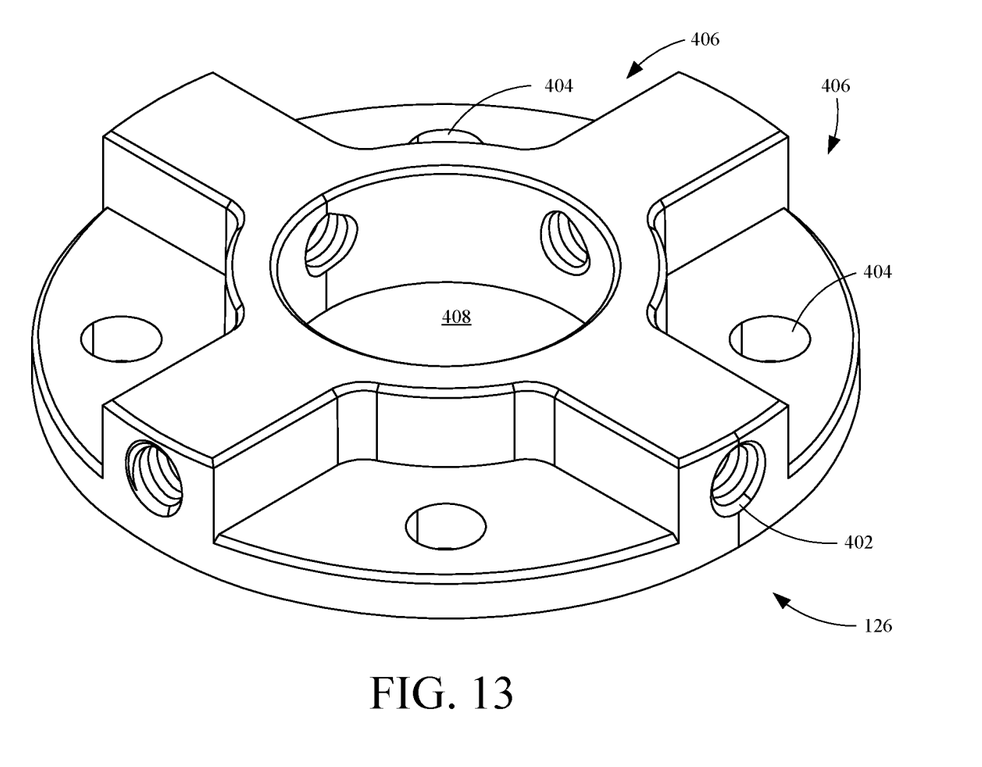
FIG. 13 is a perspective view showing an example mount in accordance with an embodiment of the present invention.

FIG. 13 is a perspective view showing an example mount in accordance with an embodiment of the present invention. As noted earlier, mount 126 couples a gearbox to a motor 102. This mounting can be accomplished through the use of mounting apertures 404. As shown, mounting apertures 404 are set within a recess 406 such that the heads of the fasteners that fit in mounting apertures 404 do not contact components that are above mount 126. In one embodiment, mounting apertures 404 are threaded apertures. Additionally, threaded apertures 402, as shown earlier, are provided to couple mount 126 to housing 116.

Figure 14:
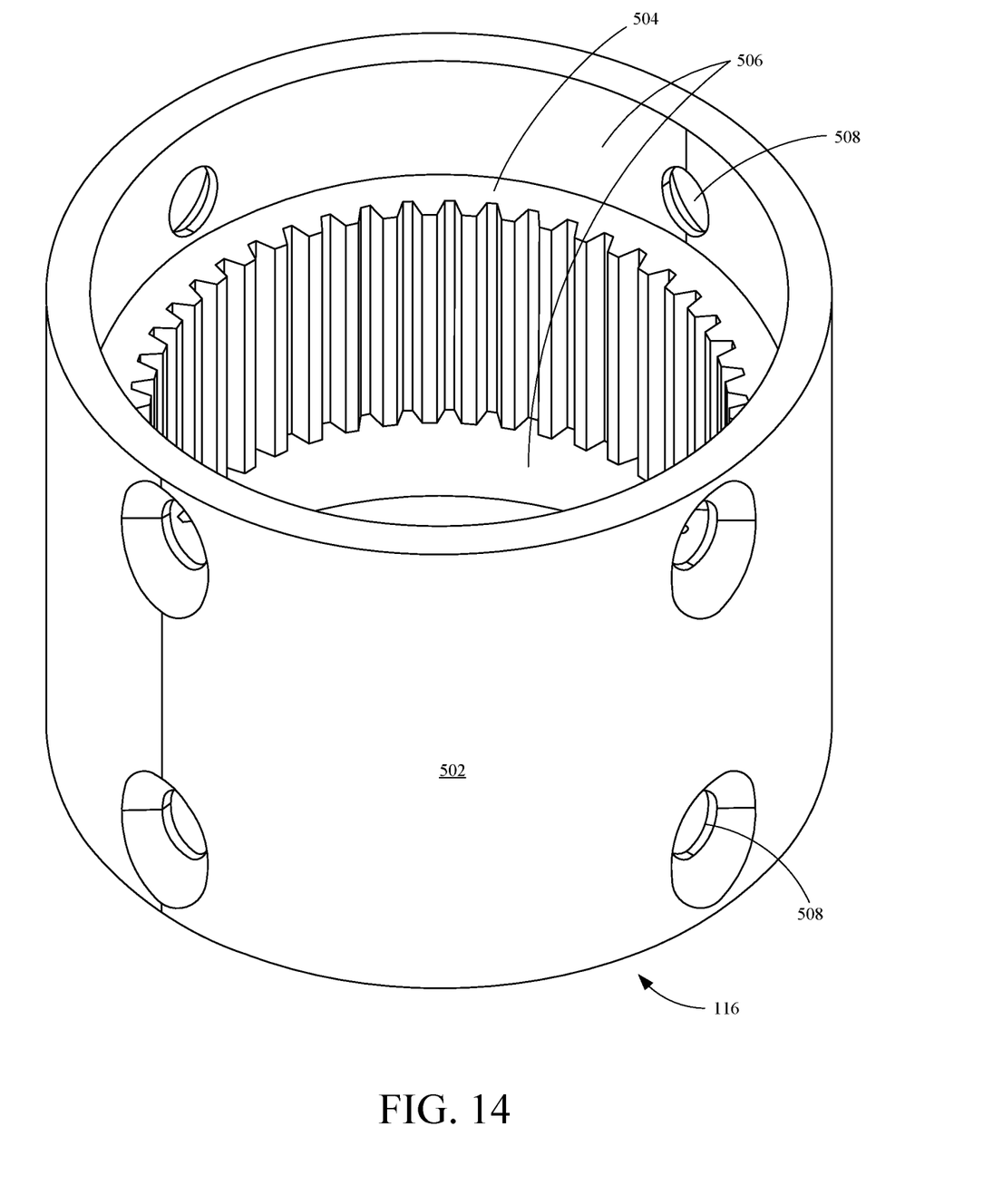
FIG. 14 is a perspective view showing an example the gearbox housing in accordance with an embodiment of the present invention.

FIG. 14 is a perspective view showing an example the gearbox housing in accordance with an embodiment of the present invention. Housing 116 includes wall 502, gear portion 504, surfaces 506 and mounting apertures 508. Wall 502 can be shaped and sized to fit within a footprint of a motor such that the gearbox increases the size of a motor/gearbox assembly in only one dimension. A plurality of mounting apertures 508 are disposed within wall 502. These mounting apertures 508 are used to couple housing 116 to other components, such as mount 126 and coupler 124. In some examples, housing 116 is symmetrical such that mount 126 and coupler 124 can be mounted on either side of housing 116. This symmetry may also allow for the stacking of multiple gearboxes on top one another to further modify the gear ratio of the overall drive system.

Although the present invention has been described with reference to preferred embodiments, workers skilled in the art will recognize that changes may be made in form and detail without departing from the spirit and scope of the invention.

What is claimed is:

1. A motor gearbox system comprising:
    a motor;
    a mount configured to couple to the motor;
    a housing configured to couple to the mount;
    a coupler configured to couple to the housing, the coupler having at least one mounting feature configured to couple to a component;
    a gear system operably coupled to the motor and configured to be disposed, at least in part, within a gearbox formed by the coupled mount, housing and coupler; and
    an output shaft operably coupled to the gear system, wherein the out rut shaft includes a first portion configured to couple to an external component and a second portion having a diameter larger than a diameter of the first portion, and wherein the second portion is configured to be coupled with a bearing to reduce friction between the output shaft and the coupler.

2. The motor gearbox system of claim 1, wherein the output shaft has a profile that is a blend of a hexagon feature and a round feature.

3. The motor gearbox system of claim 2, wherein the round feature has a diameter of 8 millimeters.

4. The motor gearbox system of claim 1, further comprising:
    a threaded aperture, disposed at an end of the output shall, configured to enable coupling of an external component to the output shaft.

5. The motor gearbox system of claim 1, wherein the diameter of the second portion is 10 millimeters.

6. The motor gearbox system of claim 1, further comprising:
    a snap ring configured to couple to the second portion to prevent longitudinal movement of the output shall.

7. The motor gearbox system of claim 1, wherein the output shaft has a shalt length of 23.5 millimeters.

8. A gearbox assembly, comprising:
    a mount;
    a housing configured to couple to the mount;
    a coupler configured to couple to the housing;
    a gear system disposed, at least in part, within the housing and configured to couple to a motor and responsively rotate upon actuation of the motor; and
    wherein the coupler includes at least one threaded aperture disposed therein, the threaded aperture being configured to allow the gearbox assembly to couple to an external component.

9. The gearbox assembly of claim 8, wherein the gear system is a planetary gear system.

10. The gearbox assembly of claim 8, wherein the at least one threaded aperture is disposed in a 16 millimeter mounting pattern.

11. The gearbox assembly of claim 8, wherein the at least one threaded aperture is disposed in a 24 millimeter mounting pattern.

12. The gearbox assembly of claim 8, wherein the gear system includes a ring gear having a uniform geometry within the housing.

13. A motor gearbox system comprising:
    a motor;
    a mount configured to couple to the motor;
    a housing configured to couple to the mount;
    a coupler configured to couple to the housing, the coupler having at least one mourning feature configured to couple to a component;
    a gear system operably coupled to the motor and configured to be disposed, at least in part, within a gearbox formed by the coupled mount, housing and coupler; and
    an output shaft operably coupled to the gear system, wherein the mount includes four threaded apertures configured to couple to a corresponding aperture pattern of the motor to mount the motor to the gearbox.

14. A gearbox assembly, comprising:
    a mount;
    a housing configured to couple to the mount;
    a coupler configured to couple to the housing;
    a gear system disposed, at least in part, within the housing and configured to couple to a motor and responsively rotate upon actuation of the motor; and
    wherein the coupler includes a first flat surface and a second flat surface disposed opposite the first flat surface, the first flat surface and the second flat surface being configured to couple the coupler to an external component having a corresponding flat surface.

15. The gearbox assembly of claim 14, wherein the second flat surface is disposed 24 millimeters from the first flat surface.

* * * * *